July 1, 1930.    F. L. GATCHET    1,769,428
SPRAYING DEVICE
Filed Jan. 10, 1928

INVENTOR
FRANCIS L. GATCHET
BY
Cook & Robinson
ATTORNEY

Patented July 1, 1930

1,769,428

UNITED STATES PATENT OFFICE

FRANCIS L. GATCHET, OF SEATTLE, WASHINGTON, ASSIGNOR, BY DIRECT AND MESNE ASSIGNMENTS, TO F. L. GATCHET, INC., OF SEATTLE, WASHINGTON, A CORPORATION OF WASHINGTON

SPRAYING DEVICE

Application filed January 10, 1928. Serial No. 245,731.

This invention relates to improvements in spraying devices, and particularly to means for dissolving and spraying commercial fertilizer; and insect poison; it being the principal object of the invention to provide a device for the above purpose that may be connected with the ordinary garden hose and which embodies a spray nozzle and a container within which a quantity of fertilizer material or poison may be contained and which has a pipe connection with the nozzle through which water will be delivered into the container for the purpose of dissolving the fertilizer or poison, and another pipe connection through which the solution will be delivered by suction into the nozzle for distribution by the spray.

The commercial fertilizer, or poison, for which the present device is especially intended is prepared in a powderly or granular form and the customary method of distributing it is to dissolve a certain quantity in a certain amount of water and then sprinkle this solution over the area desired. Another method is to distribute the material over the area and then spray it with water. Both of these methods are very unsatisfactory for the reason that an even distribution is impossible and it frequently happens that too much is placed in one spot and damage is done. It is principally for the purpose of overcoming this undesirable result that the present spray device has been provided.

Another object of the invention is to provide means for dissolving the material only as it is used.

Other objects reside in the various details of construction and in the combination of parts as is hereinafter described.

In accomplishing these and other objects of the invention, I have provided the improved details of construction, the preferred forms of which are illustrated in the accompanying drawings, wherein—

Figure 1:
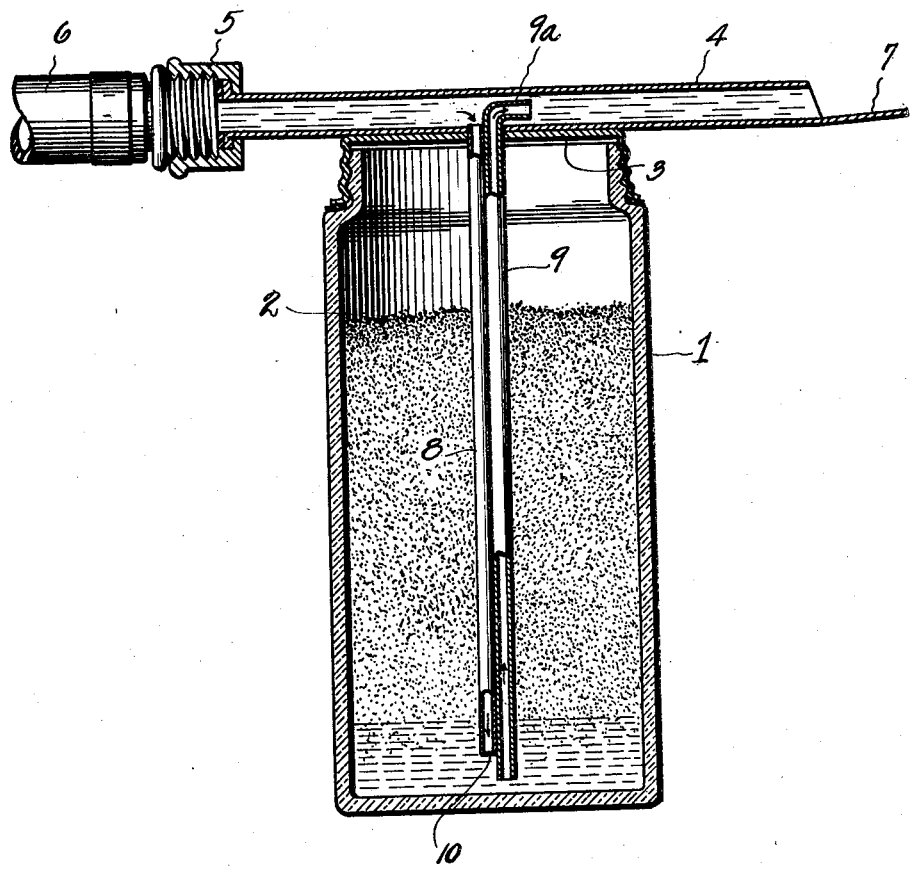
Figure 1 is a central, sectional view taken through a spray device embodied by the present invention.
Figure 2:
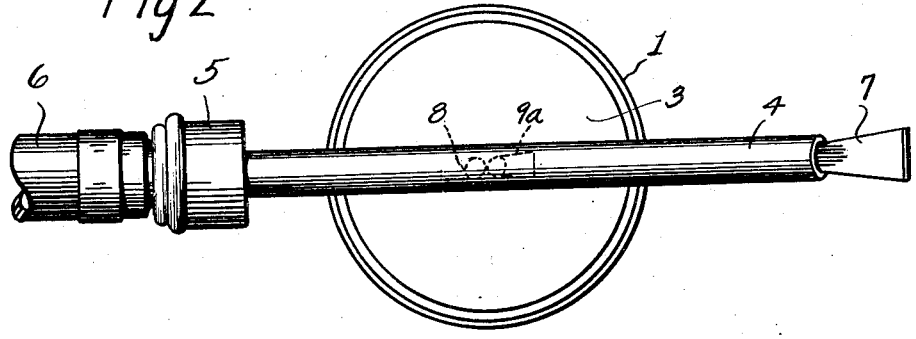
Figure 2 is a top or plan view of the device.

Referring more in detail to the drawings—

In a preferred form of construction, the device consists of a container 1, preferably a glass jar, within which an appreciable amount of material, designated at 2, may be contained. Threaded, or otherwise secured, on the top of the container, is a cover 3 and fixed centrally across this is a spray tube 4 which, at one end, has a swivel collar whereby connection may be made with a garden hose, or the like, 6, and at its other end it is equipped with a suitable spray attachment, such as the flat plate 7, whereby water discharged from the tube will be caused to spray over a wide area. The tube 4 may be secured to the cover in any suitable way such as by welding or attaching it with clips or ties.

Extending into the container to adjacent the bottom, are two tubes 8 and 9 which, at their upper ends, extend through the cover 3 and into the tube 4 where the end $9^a$ of the tube 9 is turned toward the discharge end of the spray and it is somewhat flared so as to cause greater suction to be produced in this tube. The lower end of tube 8 terminates a little above the end of the tube 9 and it is provided with a very small discharge opening as at 10, through which water may enter the container for dissolving the material.

Assuming the device to be so constructed, it is used as follows: First, the container is filled with the material 2, then the cover is tightened on the container and tube 4 connected with the water supply hose 6. Water passing through tube 4 is sprayed from the same, but some of the water entering the spray tube enters pipe 8 and is forcibly delivered through the opening 10 into the bottom of the container where it mixes with and causes some of the material to be dissolved. The force of this jet of water from opening 10 also keeps the solution in an agitated state and this accelerates the rate of dissolution. Water delivered through tube 4 past the flared end of tube 9 causes sufficient suction that the solution will be drawn from the bottom of the container and delivered through pipe 9 into the spray tube where it is mixed and discharged with the spray water.

As the material is dissolved and the solution withdrawn, the material feeds down automatically, only that in the bottom of the container it becomes wet for the reason that as fast as it is dissolved, the solution is withdrawn.

Devices of this character provide a convenient, practical and economical way of distributing commercial fertilizer and concentrated insect poison without any danger of damage to vegetation by applying too much in any one place. Such devices may be made in various sizes and it is readily apparent that details of construction could be changed without departing from the spirit of the invention and, for this reason, I do not wish to be limited in the claim only to the specific construction herein shown.

Having thus described my invention, what I claim as new therein and desire to secure by Letters-Patent, is:

A device of the character described comprising a closed container, a spray tube extended across the top of the container and having means at one end for connection with a water supply, inlet and outlet tubes leading from within the spray tube and extended into the container to near the base thereof; the inlet tube terminating short of the outlet tube and being provided at its lower end with a restricted discharge opening and the outlet tube being of larger cross sectional area than the discharge opening of the inlet pipe and extended into the spray tube and turned in the direction of flow of the water.

Signed at Seattle, Washington, this 27th day of September, 1927.

FRANCIS L. GATCHET.